United States Patent
Poolman et al.

(10) Patent No.: US 11,118,833 B2
(45) Date of Patent: Sep. 14, 2021

(54) BATTERY SYSTEM FOR REFRIGERATED TRANSPORT CONTAINER

(71) Applicant: CARRIER CORPORATION, Palm Beach Gardens, FL (US)

(72) Inventors: Ciara Poolman, Syracuse, NY (US); Robert A. Chopko, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 352 days.

(21) Appl. No.: 16/310,023

(22) PCT Filed: Jun. 16, 2017

(86) PCT No.: PCT/US2017/037902
§ 371 (c)(1),
(2) Date: Dec. 14, 2018

(87) PCT Pub. No.: WO2017/218910
PCT Pub. Date: Dec. 21, 2017

(65) Prior Publication Data
US 2020/0309440 A1   Oct. 1, 2020

Related U.S. Application Data

(60) Provisional application No. 62/351,722, filed on Jun. 17, 2016.

(51) Int. Cl.
*F25D 17/06* (2006.01)
*F25D 29/00* (2006.01)
(Continued)

(52) U.S. Cl.
CPC ......... *F25D 29/003* (2013.01); *B60H 1/3232* (2013.01); *F25D 11/003* (2013.01); *H01M 50/20* (2021.01); *H01M 2220/20* (2013.01)

(58) Field of Classification Search
CPC .... F25D 29/003; F25D 11/003; H01M 50/20; H01M 2220/20; B60H 1/3232;
(Continued)

(56) References Cited

U.S. PATENT DOCUMENTS 6,339,397 B1   1/2002   Baker
7,218,215 B2   5/2007   Salisbury et al.
(Continued)

FOREIGN PATENT DOCUMENTS

CN   1488061 A1   4/2007
CN   101251096 A   8/2008
(Continued)

OTHER PUBLICATIONS

Envirotainer. The Active Cold Chain. Operation Manual for RKN container, P/N. 120005R(). Retrieved Dec. 10, 2018 from www.envirotainer.com. 56 Pages.
(Continued)

*Primary Examiner* — Henry T Crenshaw
*Assistant Examiner* — Kamran Tavakoldavani
(74) *Attorney, Agent, or Firm* — Cantor Colburn LLP

(57) ABSTRACT

A method of operating a transport refrigeration system including: controlling, using a controller (30), a plurality of components of the transport refrigeration system, the transport refrigeration system comprising a refrigerated trailer (108) and a refrigeration unit (22) configured to provide refrigerated air to the refrigerated trailer, the controlling includes operating at least one of the refrigeration unit and a battery system (190); powering, using an external power source (400), the refrigeration unit when the transport refrigeration system is connected to the external power source; detecting, using the controller, when the external power source is disconnected from the transport refrigeration system; detecting, using the controller, a connection to the
(Continued)

battery system when the external power source is disconnected; activating the battery system when the external power source is disconnected; and powering, using the battery system, a select group of components of the refrigeration unit when the external power source is disconnected.

17 Claims, 3 Drawing Sheets

(51) Int. Cl.
*B60H 1/32* (2006.01)
*F25D 11/00* (2006.01)
*H01M 50/20* (2021.01)

(58) Field of Classification Search
CPC ........ B60H 2001/3292; B60H 1/00378; B60H 1/00428; B60H 1/00771; B60H 1/00778
USPC .......................................................... 62/89
See application file for complete search history.

(56) References Cited

U.S. PATENT DOCUMENTS

| | | | |
|---|---|---|---|
| 7,592,916 | B2 | 9/2009 | Staples |
| 7,765,831 | B2 | 8/2010 | Rodriguez et al. |
| 8,162,542 | B2 | 4/2012 | Harman et al. |
| 8,890,683 | B2 | 11/2014 | Schnitz et al. |
| 2004/0183673 | A1 | 9/2004 | Nageli |
| 2004/0226309 | A1 | 11/2004 | Broussard |
| 2008/0186163 | A1 | 8/2008 | Mills |
| 2012/0050531 | A1 | 3/2012 | Wu |
| 2012/0159971 | A1* | 6/2012 | Fink .......................... B60P 3/20 62/56 |
| 2013/0298575 | A1 | 11/2013 | Stark et al. |
| 2014/0060097 | A1* | 3/2014 | Perreault .............. B60H 1/3232 62/133 |
| 2016/0089956 | A1* | 3/2016 | Viegas ................. B60H 1/3211 62/98 |
| 2017/0210194 | A1* | 7/2017 | Ling ................... H01M 10/441 |

FOREIGN PATENT DOCUMENTS

| | | |
|---|---|---|
| CN | 101508263 A | 8/2009 |
| CN | 203959038 U | 11/2014 |
| CN | 104884305 A | 9/2015 |
| DE | 8533595 U1 | 1/1986 |
| WO | 2015174830 A1 | 11/2015 |

OTHER PUBLICATIONS

Grover, S. "Solar-Powered Shipping Container Architecture That Actually Makes Sense", Published Mar. 12, 2012. Retrieved Dec. 10, 2018 from https://www.treehugger.com/green-architecture/solar-powered-shipping-container-architecture-actually-makes-sense.html. 9 pages.

Kilnge Corporation. Klinge Temperature Control. Military Refrigerated Containers. Retrieved Dec. 10, 2018 from https://klingecorp.com/military/. 6 Pages.

Military Solar Powered Shipping Container. OkSolar.com—Renewable Energy Solutions. Retrieved Dec. 10, 2018 rrom https://www.oksolar.com/lion/Item/359575/military-solar-powered-shipping-container. 11 Pages.

Notification of Transmittal of the International Search Report for International Application No. PCT/US2017/037902; Report dated Feb. 14, 2018; 1-8 pages.

Written Opinion of the International Searching Authority for International Application No. PCT/US2017/037902; Report dated Feb. 14, 2018; 1-10 pages.

First Chinese Office Action for Application No. 201780042449.6; Office Action dated Jun. 22, 2020; 9 pages.

\* cited by examiner

BATTERY SYSTEM FOR REFRIGERATED TRANSPORT CONTAINER

BACKGROUND OF THE DISCLOSURE

The embodiments herein generally relate to "all electric" transport refrigeration systems and more specifically, a method and apparatus for operating such systems.

Typically, transport refrigeration systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, transport refrigeration systems allow perishable goods to be effectively transported and distributed without damage or other undesirable effects.

Refrigerated transport containers are commonly used to transport perishable goods in a cold chain distribution system. A transport refrigeration system includes a refrigeration unit in operative association with a cargo space defined within the refrigerated transport container for maintaining a controlled temperature environment within the cargo space.

Conventionally, transport refrigeration systems used in connection with refrigerated transport containers include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated transport containers, the compressor, and typically other components of the refrigeration unit, must be powered during transit by a prime mover. The prime mover typically comprises a diesel engine carried on the vehicle transporting the transport refrigeration system.

An "all electric" transport refrigeration system for a refrigerated transport container application is also commercially available through Carrier Corporation. In the all electric transport refrigeration system, a prime mover, most commonly a diesel engine drives an AC synchronous generator that generates AC power. The generated AC power is used to power an electric compressor motor for driving the refrigerant compressor of the refrigeration unit and also powering electric AC fan motors for driving the condenser and evaporator motors and electric heaters associated with the evaporator. For example, U.S. Pat. No. 6,223,546 discloses an all electric transport refrigeration system.

Some "all electric" transport refrigeration systems contain a prime mover, while others depend upon an external power source that is carried on the vehicle transporting the transport refrigeration system. For instance, the prime mover or power source may be located on the truck or boat carrying the refrigeration system. Thus, when a refrigeration system dependent on an external power source is disconnected from that external power source, the refrigeration system may no longer be able to operate without a direct connection to the external power source. A more continuous source of power is desired.

BRIEF DESCRIPTION OF THE DISCLOSURE

According to one embodiment, a method of operating a transport refrigeration system is provided. The method including: controlling, using a controller, a plurality of components of the transport refrigeration system, the transport refrigeration system including a refrigerated trailer and a refrigeration unit configured to provide refrigerated air to the refrigerated trailer, the controlling includes operating at least one of the refrigeration unit and a battery system; powering, using an external power source, the refrigeration unit when the transport refrigeration system is connected to the external power source; detecting, using the controller, when the external power source is disconnected from the transport refrigeration system; detecting, using the controller, a connection to the battery system when the external power source is disconnected from the transport refrigeration system; activating the battery system when the external power source is disconnected from the transport refrigeration system; and powering, using the battery system, a select group of components of the refrigeration unit when the external power source is disconnected from the transport refrigeration system.

In addition to one or more of the features described above, or as an alternative, further embodiments of the method may include removing, using the controller, refrigerant from a refrigerant compression device of the refrigeration unit when the external power source is disconnected from the transport refrigeration system.

In addition to one or more of the features described above, or as an alternative, further embodiments of the method may include: monitoring, using a location tracking device, a location of the transport refrigeration system; determining, using the controller, a time of travel for the transport refrigeration system; and rationing, using the controller, a power draw from the battery system to the transport refrigeration system in response to the time of travel.

In addition to one or more of the features described above, or as an alternative, further embodiments of the method may include that the battery system is integrally attached to a refrigerated transport container of the transport refrigeration system.

In addition to one or more of the features described above, or as an alternative, further embodiments of the method may include that the battery system is integrally attached to a drop deck configured to carry a refrigerated transport container of the transport refrigeration system, the drop deck being releasably connected to the refrigerated transport container.

In addition to one or more of the features described above, or as an alternative, further embodiments of the method may include that the location tracking device is a global positioning system configured to monitor the location of the transport refrigeration system.

In addition to one or more of the features described above, or as an alternative, further embodiments of the method may include that the battery system is composed of at least one of a lithium ion battery, a nickel-metal hydride battery, an alkaline battery, a nickel-hydrogen battery, and a lead-acid battery.

According to another embodiment, a controller for a refrigeration unit of a transport refrigeration system including: a processor; and a memory including computer-executable instructions that, when executed by the processor, cause the processor to perform operations. The operations including: controlling, using the controller, a plurality of components of the transport refrigeration system, the transport refrigeration system including a refrigerated trailer and a refrigeration unit configured to provide refrigerated air to the refrigerated trailer, the controlling includes operating at least one of the refrigeration unit and a battery system; powering, using an external power source, the refrigeration unit when the transport refrigeration system is connected to the external power source; detecting, using the controller, when the external power source is disconnected from the transport refrigeration system; detecting, using the controller, a connection to the battery system when the external power source is disconnected from the transport refrigeration system; activating the battery system when the external power source is disconnected from the transport refrigeration system; and powering, using the battery system, a select group of components of the refrigeration unit when the external power source is disconnected from the transport refrigeration system.

In addition to one or more of the features described above, or as an alternative, further embodiments of the controller may include that the operations further include: removing, using the controller, refrigerant from a refrigerant compression device of the refrigeration unit when the external power source is disconnected from the transport refrigeration system.

In addition to one or more of the features described above, or as an alternative, further embodiments of the controller may include that the operations further include: monitoring, using a location tracking device, a location of the transport refrigeration system; determining, using the controller, a time of travel for the transport refrigeration system; and rationing, using the controller, a power draw from the battery system to the transport refrigeration system in response to the time of travel.

In addition to one or more of the features described above, or as an alternative, further embodiments of the controller may include that the battery system is integrally attached to a refrigerated transport container of the transport refrigeration system.

In addition to one or more of the features described above, or as an alternative, further embodiments of the controller may include that the battery system is integrally attached to a drop deck configured to carry a refrigerated transport container of the transport refrigeration system, the drop deck being releasably connected to the refrigerated transport container.

In addition to one or more of the features described above, or as an alternative, further embodiments of the controller may include that the location tracking device is a global positioning system configured to monitor the location of the transport refrigeration system.

In addition to one or more of the features described above, or as an alternative, further embodiments of the controller may include that the battery system is composed of at least one of a lithium ion battery, a nickel-metal hydride battery, an alkaline battery, a nickel-hydrogen battery, and a lead-acid battery.

According to another embodiment, a computer program product tangibly embodied on a computer readable medium is provided. The computer program product including instructions that, when executed by a processor, cause the processor to perform operations. The operations including: controlling, using a controller, a plurality of components of the transport refrigeration system, the transport refrigeration system including a refrigerated trailer and a refrigeration unit configured to provide refrigerated air to the refrigerated trailer, the controlling includes operating at least one of the refrigeration unit and a battery system; powering, using an external power source, the refrigeration unit when the transport refrigeration system is connected to the external power source; detecting, using the controller, when the external power source is disconnected from the transport refrigeration system; detecting, using the controller, a connection to the battery system when the external power source is disconnected from the transport refrigeration system; activating the battery system when the external power source is disconnected from the transport refrigeration system; and powering, using the battery system, a select group of components of the refrigeration unit when the external power source is disconnected from the transport refrigeration system.

In addition to one or more of the features described above, or as an alternative, further embodiments of the computer program may include that the operations further include: removing, using the controller, refrigerant from a refrigerant compression device of the refrigeration unit when the external power source is disconnected from the transport refrigeration system.

In addition to one or more of the features described above, or as an alternative, further embodiments of the computer program may include that the operations further include: monitoring, using a location tracking device, a location of the transport refrigeration system; determining, using the controller, a time of travel for the transport refrigeration system; and rationing, using the controller, a power draw from the battery system to the transport refrigeration system in response to the time of travel.

In addition to one or more of the features described above, or as an alternative, further embodiments of the computer program may include that the battery system is integrally attached to a refrigerated transport container of the transport refrigeration system.

In addition to one or more of the features described above, or as an alternative, further embodiments of the computer program may include that the battery system is integrally attached to a drop deck configured to carry a refrigerated transport container of the transport refrigeration system, the drop deck being releasably connected to the refrigerated transport container.

In addition to one or more of the features described above, or as an alternative, further embodiments of the computer program may include that the location tracking device is a global positioning system configured to monitor the location of the transport refrigeration system.

In addition to one or more of the features described above, or as an alternative, further embodiments of the computer program may include that the battery system is composed of at least one of a lithium ion battery, a nickel-metal hydride battery, an alkaline battery, a nickel-hydrogen battery, and a lead-acid battery.

Technical effects of embodiments of the present disclosure include monitoring a location of the transport refrigeration system, detecting a disconnection from an external power source, switching the power source of the refrigeration unit from the prime mover to the battery system, and allocating the draw of power from the battery system between components of the refrigeration system to ensure the battery system will maintain power during a time of travel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
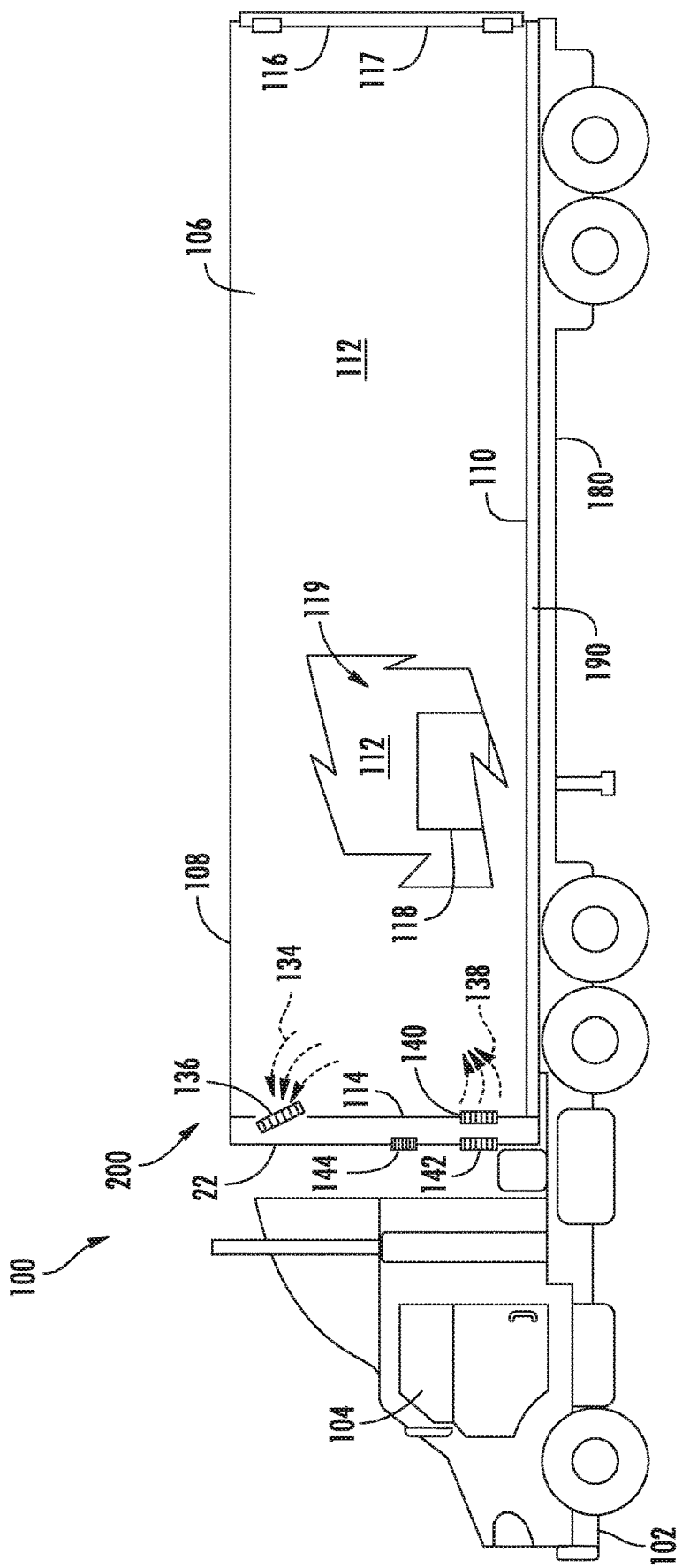
FIG. 1 is a schematic illustration of a transport refrigeration system, according to an embodiment of the present disclosure.
Figure 2:
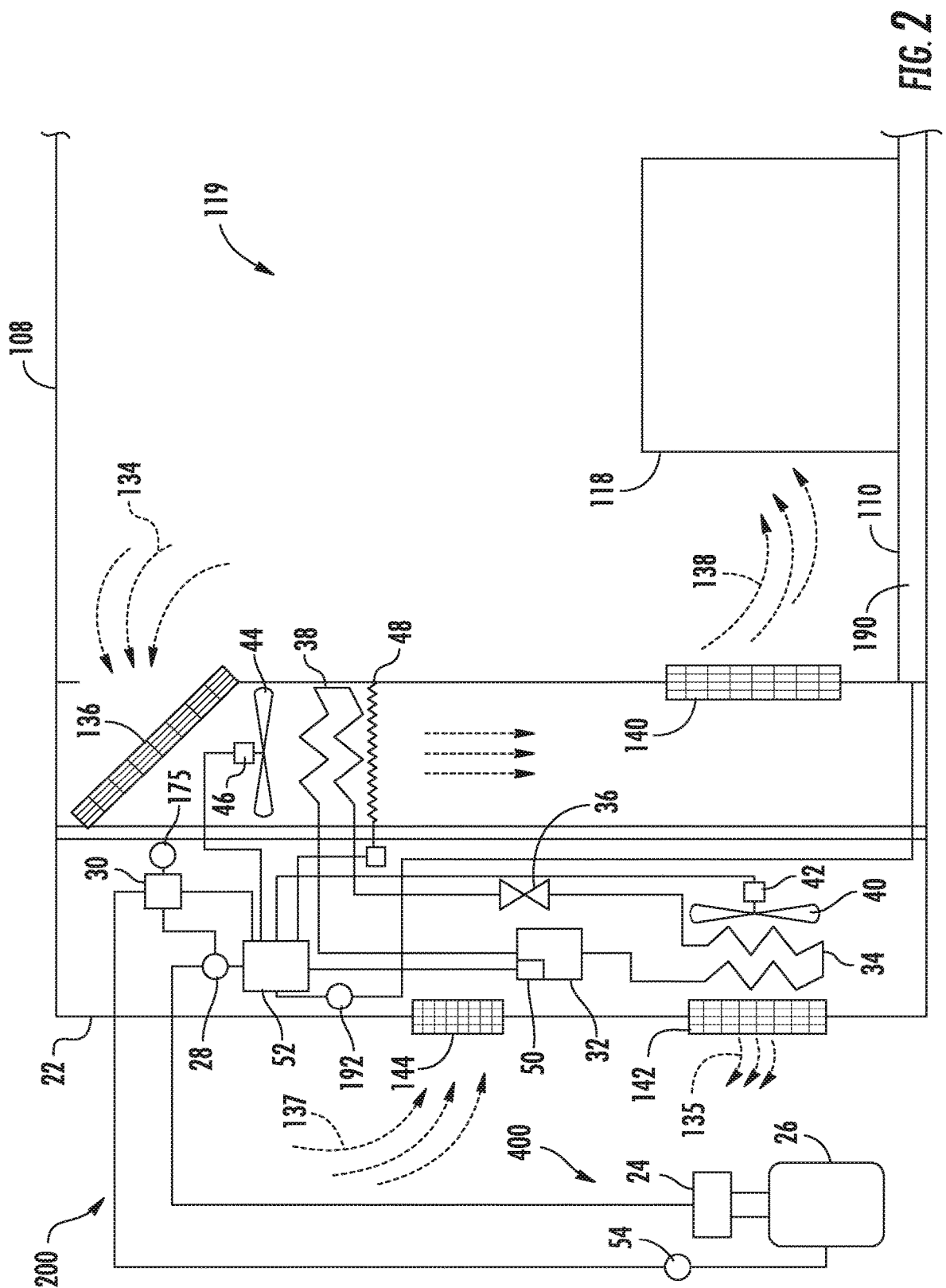
FIG. 2 is an enlarged schematic illustration of the transport refrigeration system of FIG. 1, according to an embodiment of the present disclosure.

FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure. The transport refrigeration system 200 is being illustrated as a trailer system 100 as seen in FIG. 1. It is appreciated by those of skill in the art that embodiments described herein may be applied to any transport refrigeration system such as, for example shipping containers that are shipped by rail, sea, or any other suitable container, without use of a tractor 102. The trailer system 100 includes a tractor 102. The tractor 102 includes an operator's compartment or cab 104 and an engine (not shown), which acts as the drive system of the trailer system 100. The transport refrigeration system includes a transport container and a refrigeration unit 22. The refrigerated transport container 106 is coupled or releasably connected to the tractor 102. The refrigerated transport container 106 is a refrigerated trailer and includes a top wall 108, a directly opposed bottom wall 110, opposed side walls 112, and a front wall 114, with the front wall 114 being closest to the tractor 102. The refrigerated transport container 106 further includes a door or doors 117 at a rear wall 116, opposite the front wall 114. The walls of the refrigerated transport container 106 define a refrigerated cargo space 119.

Separate from the transport refrigeration system 200 is an external power source 400 composed of an electric generation device 24 and a prime mover 26 for driving the electric generation device 24. The external power source 400 provides power to the refrigeration system 200, when the refrigeration system is connected to the external power source 400. The external power source 400 may be located on the truck 102, boat, or another location or vehicle that may store or carry the transport refrigeration system 200. It is appreciated by those of skill in the art that the external power source 400 need not include a prime mover 26 and electric generation device 24 as illustrated in FIG. 2, but instead may be any other power source as known by one of skill in the art.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring refrigerated transport.

The refrigeration unit 22 functions, under the control of a controller 30, to establish and regulate a desired environmental parameters such as, for example temperature, pressure, humidity, carbon dioxide, ethylene, ozone, light exposure, vibration exposure, and other conditions in the interior compartment 119 as known to one of ordinary skill in the art. In an embodiment, the refrigeration unit 22 is a refrigeration system capable of providing a desired temperature and humidity range. The controller 30 may also be able to selectively operate the prime mover 26, typically through an electronic engine controller 54 operatively associated with the prime mover 26.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 includes the controller 30 configured for controlling operation of the transport refrigeration system 200 including, but not limited to, the operation of various components of the refrigerant unit 22 to provide and maintain a desired thermal environment within the refrigerated cargo space 119. The controller 30 may also be able to selectively operate the battery system 190. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

The prime mover 26, which comprises a fossil-fuel engine, most commonly a diesel engine, drives the electric generation device 24 that generates electrical power. The drive shaft of the engine drives the shaft of the electric generation device 24. The electric generation device 24 may comprise a single engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

In the illustrated embodiment, the transport refrigeration system 200 includes a battery system 190, as seen in FIGS. 1 and 2. The battery system 190 is configured to power the refrigeration unit 22. The battery system 190 may be small and provide power to only critical components of the transport refrigeration system 200 or the battery system 190 may be large enough to power the transport refrigeration system 200 when the external power source 400 is disconnected. In an embodiment, the controller 30 may be able to detect when the external power source 400 is disconnected from the transport refrigeration system 200 and command the refrigeration unit 22 to begin drawing power from the battery system 190. The battery system 190 may comprise at least one of a lithium ion battery, a nickel-metal hydride battery, an alkaline battery, a nickel-hydrogen battery, and a lead-acid battery. The battery system 190 may include a voltage regulator 192 to sense and/or regulate the voltage of the battery system 190.

In the illustrated embodiment, the battery system 190 is integrally attached to the refrigerated transport container 106 of the transport refrigeration system 200 and located proximate the bottom wall 110 of the refrigerated transport container 106. The battery system 190 may be integrally attached to the refrigerated transport container 106 at various other locations, including but not limited to proximate the top wall 108, proximate the rear wall 116, proximate the front wall 114, or within the refrigerated cargo space 119. In another embodiment, the battery system 190 is integrally attached to a drop deck 180 configured to carry the refrigerated transport container 106 of the transport refrigeration system 200. The drop deck 180 is releasably connected to the refrigerated transport container 106.

In the illustrated embodiment, the transport refrigeration system 200 may also include a location tracking device 175 operably connected to the controller 30, as seen in FIG. 2. The location tracking device 175 may receive a manual input from an operator via a user device such as, for example, a driver dashboard in the cab 104, a cellular phone, tablet, laptop, smartwatch, desktop computer or any similar device known to one of skill in the art. The manual input may instruct the controller 30 to deactivate the prime mover 26 and activate the battery system 190 to power the refrigeration unit 22, or activate the prime mover 26 and deactivate the battery system 190 to power the refrigeration unit 22. In another embodiment, the location tracking device 175 automatically and continuously tracks the location of the refrigeration system 200 such as, for example, a global positioning system configured to monitor the location of the transport refrigeration system 200. The global positioning system may continuously monitor the location of the transport refrigeration system 200 and may allow the controller 30 to determine the travel time to a final destination or next external power source location. The final destination may be stored in the memory of the controller 30 or stored in a remote database wirelessly connected to the controller 30. The wireless connection may be a wireless communication method such as, for example, radio, microwave, cellular, satellite, or another wireless communication method known to one of skill in the art.

The controller 30 may take into account a variety of parameters when determining travel time, such as, for example weather, traffic, geographical distance, construction zones or any other parameter that may affect travel time known to one of skill in the art. The travel time allows the controller 30 to allocate the power draw from the battery source 190. The controller 30 may determine to operate a select group of components in response to the travel time. The select group of components may include some or all components of the transport refrigeration unit 22. In an embodiment, the select group of components may be components required to operate a pump down process of the refrigerant compression device 32. During a pump down process, refrigerant is removed from the refrigerant compression device 32. Advantageously, a pump down process may help protect a refrigerant compression device on start up because after the refrigeration unit has been shut down for an extended period of time an excessive amount of refrigerant tends to build up in the refrigerant compression device that may cause damage on start up.

Airflow is circulated into and through the refrigerate cargo space 119 of the refrigerated transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the refrigerated transport container 106 through the refrigeration unit outlet 140, which in some embodiments is located near the bottom wall 110 of the container system 106. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 cools the perishable goods 118 in the refrigerated cargo space 119 of the refrigerated transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

Figure 3:
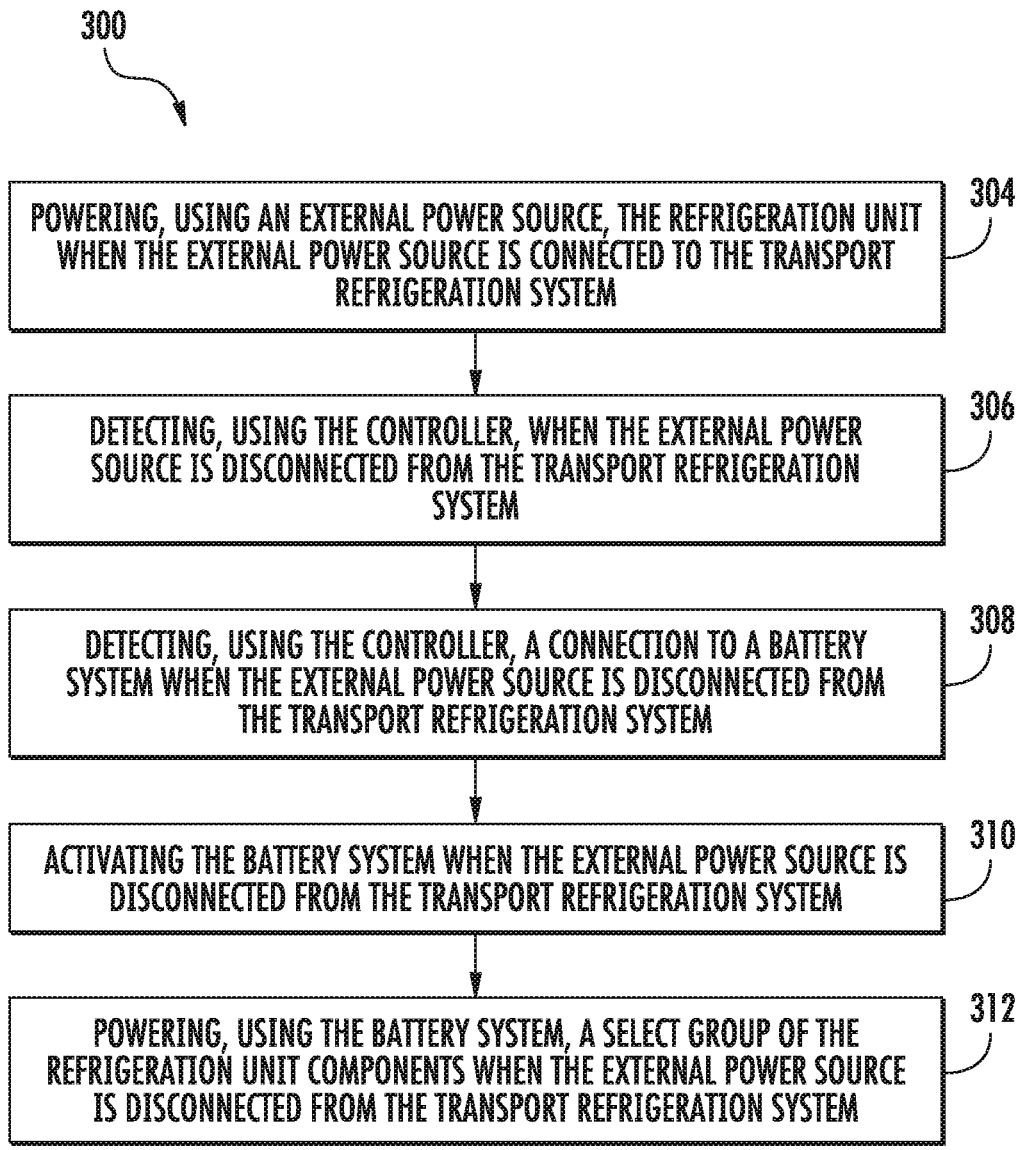
FIG. 3 is a flow diagram illustrating a method of operating a refrigeration unit of the transport refrigeration system of FIG. 1, according to an embodiment of the present disclosure.

Referring now also to FIG. 3, which shows a flow diagram illustrating a method 300 of operating the transport refrigeration system 200 of FIG. 1. At block 304, the external power source 400 powers the refrigeration unit 22 when the transport refrigeration system 200 is connected to the external power source 400. Next at block 306, the controller 30 detects when the external power source 400 is disconnected from the transport refrigeration system 200. Further at block 308, the controller 30 detects a connection to the battery system 190 when the external power source 400 is disconnected from the transport refrigeration system 200. Next at block 310, the battery system 190 is activated when the external power source 400 is disconnected from the transport refrigeration system 200. The battery system 190 may be activated by the controller 30 and/or a manual input. Subsequently at block 312, the battery system 190 powers a select group of components of the refrigeration unit 22 when the external power source 400 is disconnected from the transport refrigeration system 200.

The method 300 may also include a pump down process, as discussed above, where the controller 30 removes refrigerant from the refrigerant compression device 32 when the external power source 400 is disconnected from the transport refrigeration system 200. The method may also include the monitoring, using a location tracking device 175, a location of the transport refrigeration system; determining, using the controller 30, a time of travel for the transport refrigeration system; and rationing, using the controller 30, a power draw from the battery system 190 to the transport refrigeration system 200 in response to the time of travel. Depending on the time of travel and the perishable goods 118 within the refrigerated transport container 106, the controller may ration the power sent to the transport refrigeration system 200 by powering some components but not others. For instance, if the perishable goods 118 are highly susceptible to spoilage, the controller may need to devote more power to keeping the refrigerated transport container 106 cool, rather than powering auxiliary equipment not necessary for cooling the perishable goods 118.

While the above description has described the flow process of FIG. 3 in a particular order, it should be appreciated that unless otherwise specifically required in the attached claims that the ordering of the steps may be varied.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a transport refrigeration system, the method comprising:

controlling, using a controller, a plurality of components of the transport refrigeration system, the transport refrigeration system comprising a refrigerated trailer and a refrigeration unit configured to provide refrigerated air to the refrigerated trailer, wherein the controlling comprises operating at least one of the refrigeration unit and a battery system;

powering, using an external power source, the refrigeration unit when the transport refrigeration system is connected to the external power source;

detecting, using the controller, when the external power source is disconnected from the transport refrigeration system;

detecting, using the controller, a connection to the battery system when the external power source is disconnected from the transport refrigeration system;

activating the battery system when the external power source is disconnected from the transport refrigeration system; and powering, using the battery system, a select group of components of the refrigeration unit when the external power source is disconnected from the transport refrigeration system;

monitoring, using a location tracking device, a location of the transport refrigeration system;

determining, using the controller, a time of travel for the transport refrigeration system; and rationing, using the controller, a power draw from the battery system to the transport refrigeration system in response to the time of travel.

2. The method of claim 1, further comprising:

removing, using the refrigeration unit, refrigerant from a refrigerant compression device of the refrigeration unit when the external power source is disconnected from the transport refrigeration system.

3. The method of claim 1, wherein:

the battery system is integrally attached to a refrigerated transport container of the transport refrigeration system.

4. The method of claim 1, wherein:

the battery system is integrally attached to a drop deck configured to carry a refrigerated transport container of the transport refrigeration system, the drop deck being releasably connected to the refrigerated transport container.

5. The method of claim 1, wherein:

the location tracking device is a global positioning system configured to monitor the location of the transport refrigeration system.

6. The method of claim 1, wherein:

the battery system is composed of at least one of a lithium ion battery, a nickel metal hydride battery, an alkaline battery, a nickel-hydrogen battery, and a lead-acid battery.

7. A controller for a refrigeration unit of a transport refrigeration system comprising:

a processor;

a memory comprising computer-executable instructions that, when executed by the processor, cause the processor to perform operations, the operations comprising:

controlling, using the controller, a plurality of components of the transport refrigeration system, the transport refrigeration system comprising a refrigerated trailer and a refrigeration unit configured to provide refrigerated air to the refrigerated trailer, wherein the controlling comprises operating at least one of the refrigeration unit and a battery system;

powering, using an external power source, the refrigeration unit when the transport refrigeration system is connected to the external power source;

detecting, using the controller, when the external power source is disconnected from the transport refrigeration system;

detecting, using the controller, a connection to the battery system when the external power source is disconnected from the transport refrigeration system;

activating the battery system when the external power source is disconnected from the transport refrigeration system; and powering, using the battery system, a select group of components of the refrigeration unit when the external power source is disconnected from the transport refrigeration system;

monitoring, using a location tracking device, a location of the transport refrigeration system;

determining, using the controller, a time of travel for the transport refrigeration system; and rationing, using the controller, a power draw from the battery system to the transport refrigeration system in response to the time of travel.

8. The controller of claim 7, wherein the operations further comprise:

removing, using the refrigeration unit, refrigerant from a refrigerant compression device of the refrigeration unit when the external power source is disconnected from the transport refrigeration system.

9. The controller of claim 7, wherein:

the battery system is integrally attached to a refrigerated transport container of the transport refrigeration system.

10. The controller of claim 7, wherein:

the battery system is integrally attached to a drop deck configured to carry a refrigerated transport container of the transport refrigeration system, the drop deck being releasably connected to the refrigerated transport container.

11. The controller of claim 7, wherein:

the location tracking device is a global positioning system configured to monitor the location of the transport refrigeration system.

12. The controller of claim 7, wherein:

the battery system is composed of at least one of a lithium ion battery, a nickel metal hydride battery, an alkaline battery, a nickel-hydrogen battery, and a lead-acid battery.

13. A computer program product tangibly embodied on a computer readable medium, the computer program product including instructions that, when executed by a processor, cause the processor to perform operations comprising:

controlling, using a controller, a plurality of components of a transport refrigeration system, the transport refrigeration system comprising a refrigerated trailer and a refrigeration unit configured to provide refrigerated air to the refrigerated trailer, wherein the controlling comprises operating at least one of the refrigeration unit and a battery system;

powering, using an external power source, the refrigeration unit when the transport refrigeration system is connected to the external power source;

detecting, using the controller, when the external power source is disconnected from the transport refrigeration system;

detecting, using the controller, a connection to the battery system when the external power source is disconnected from the transport refrigeration system;

activating the battery system when the external power source is disconnected from the transport refrigeration system; and powering, using the battery system, a select group of components of the refrigeration unit when the external power source is disconnected from the transport refrigeration system;

monitoring, using a location tracking device, a location of the transport refrigeration system;

determining, using the controller, a time of travel for the transport refrigeration system; and rationing, using the controller, a power draw from the battery system to the transport refrigeration system in response to the time of travel.

14. The computer program of claim 13, wherein the operations further comprise:

removing, using the refrigeration unit, refrigerant from a refrigerant compression device of the refrigeration unit when the external power source is disconnected from the transport refrigeration system.

15. The computer program of claim 13, wherein:

the battery system is integrally attached to a refrigerated transport container of the transport refrigeration system.

16. The computer program of claim 13, wherein:
the battery system is integrally attached to a drop deck configured to carry a refrigerated transport container of the transport refrigeration system, the drop deck being releasably connected to the refrigerated transport container.

17. The computer program of claim 13, wherein:
the location tracking device is a global positioning system configured to monitor the location of the transport refrigeration system.

* * * * *